United States Patent
Sheridan et al.

(10) Patent No.: US 11,789,743 B2
(45) Date of Patent: Oct. 17, 2023

(54) HOST OPERATING SYSTEM IDENTIFICATION USING TRANSPORT LAYER PROBE METADATA AND MACHINE LEARNING

(71) Applicant: Tenable, Inc., Columbia, MD (US)

(72) Inventors: Barry Sheridan, Dublin (IE); Jesus Garcia Galan, Dublin (IE)

(73) Assignee: Tenable, Inc., Columbia, MD (US)

( * ) Notice: Subject to any disclaimer, the term of this patent is extended or adjusted under 35 U.S.C. 154(b) by 240 days.

(21) Appl. No.: 17/150,068

(22) Filed: Jan. 15, 2021

(65) Prior Publication Data
US 2022/0229669 A1 Jul. 21, 2022

(51) Int. Cl.
| | |
|---|---|
| G06F 9/00 | (2006.01) |
| G06F 9/4401 | (2018.01) |
| G06F 9/30 | (2018.01) |
| G06F 16/907 | (2019.01) |
| G06N 20/00 | (2019.01) |
| G06F 9/52 | (2006.01) |

(52) U.S. Cl.
CPC ........ G06F 9/4406 (2013.01); G06F 9/30007 (2013.01); G06F 9/52 (2013.01); G06F 16/907 (2019.01); G06N 20/00 (2019.01); G06F 9/4401 (2013.01)

(58) Field of Classification Search
CPC ...... G06F 9/4406; G06F 9/30007; G06F 9/52; G06F 16/907; G06N 20/00; G06N 5/01
USPC .......................................................... 713/2
See application file for complete search history.

(56) References Cited

U.S. PATENT DOCUMENTS

| | | | |
|---|---|---|---|
| 11,102,082 B1* | 8/2021 | Sarel | H04L 69/22 |
| 11,555,877 B2* | 1/2023 | Tiwari | G06T 7/136 |
| 11,556,633 B2* | 1/2023 | Mukherjee | G06F 21/53 |
| 11,557,041 B2* | 1/2023 | Kulandai Samy | G06T 7/20 |
| 2007/0160962 A1* | 7/2007 | Jones | G06F 9/4406 434/118 |
| 2008/0005370 A1* | 1/2008 | Bolan | G06F 9/4411 710/8 |
| 2018/0234325 A1* | 8/2018 | Moiyallah, Jr. | G06N 20/00 |
| 2019/0215312 A1* | 7/2019 | Zigdon | H04W 12/128 |
| 2019/0220334 A1* | 7/2019 | Al Sharnouby | G06F 9/4843 |
| 2020/0327225 A1* | 10/2020 | Nguyen | G06N 3/044 |
| 2021/0279565 A1* | 9/2021 | Akella | H04L 63/102 |
| 2021/0281565 A1* | 9/2021 | Akella | H04L 63/0876 |

(Continued)

OTHER PUBLICATIONS

Derek Wuelfrath, fingerbank/README.md at master—karottc/fingerbank—GitHub, https://github.com/karottc/fingerbank/blob/master/README.md, Jan. 14, 2021.

(Continued)

*Primary Examiner* — Volvick Derose
(74) *Attorney, Agent, or Firm* — Muncy, Geissler, Olds & Lowe, P.C.; Daniel Podhajny

(57) ABSTRACT

Techniques, methods and/or apparatuses are disclosed that enable detection of an operating system of a host. Through the disclosed techniques, an operating system detection model, which may be a form of a machine learning model, may be trained to detect operating system. The operating system detection model may be provided to an operating system detector to detect operating system of a host utilizing transport layer probes without the need to have credentialed access to the host.

24 Claims, 7 Drawing Sheets

(56) References Cited

U.S. PATENT DOCUMENTS

| | | | | |
|---|---|---|---|---|
| 2021/0281566 A1* | 9/2021 | Akella | .................. | H04L 67/306 |
| 2022/0210079 A1* | 6/2022 | Koren | ................. | H04L 63/1425 |
| 2022/0294822 A1* | 9/2022 | Shmelev | ............. | H04L 63/1491 |
| 2022/0351065 A1* | 11/2022 | Mitra | ....................... | G06F 9/445 |
| 2022/0374208 A1* | 11/2022 | Allamanis | ................. | G06F 8/33 |
| 2023/0005616 A1* | 1/2023 | Zhang | .................... | G16H 10/60 |

OTHER PUBLICATIONS julsemaan, fingerbank/dhcp_fingerprints.conf at master—karottc/fingerbank—GitHub, https://github.com/karottc/fingerbank/blob/master/dhcp_fingerprints.conf, Jan. 14, 2021.

OS Detection, Nmap Network Scanning, Chapter 15. Nmap Reference Guide, https://nmap.org/book/man-os-detection.html, Jan. 14, 2021.

P0f Package Description, p0f Penetration Testing Tools, https://tools.kali.org/information-gathering/p0f, Jan. 14, 2021.

Patrice Auffret, "SinFP, Unification of Active and Passive Operating System Fingerprinting", Thomson Corporate Research Security Labs, p. 1-16.

xprobe2(1)—Linux man page, https://linux.die.net/man/1/xprobe2, Jan. 14, 2021.

* cited by examiner

HOST OPERATING SYSTEM IDENTIFICATION USING TRANSPORT LAYER PROBE METADATA AND MACHINE LEARNING

TECHNICAL FIELD

Various aspects and embodiments described herein generally relate to host operating system identification, and more particularly to host operating system identification using transport layer probe metadata and machine learning.

BACKGROUND

Determining a host operating system (OS) remotely is difficult for reasons such as changing port address translation/network address translation (PAT/NAT) configurations, intermediate filtering devices and packet normalization, or system hardening. Also, OS identification is especially difficult to do for hosts without credentialed access to, and without leading to system/network disturbance.

Traditional approaches to identify operating systems of hosts rely on maintaining a known operating system lookup, via active or passive fingerprinting. Unfortunately, this is a manual and error-prone task as entries can easily become out of date. Bad entries can also reduce accuracy of subsequent predictions. Some conventional approaches also rely on application-level protocol metadata, which is usually not consistent or available in case the host is properly hardened. For those approaches that rely on active fingerprinting, the retrieval of the necessary information may require crafting very specific network requests. This can result in host/network disturbance.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

An embodiment may be directed to a method for training an operating system (OS) detector. The method may be performed by an OS detection trainer. The method may comprise obtaining a training dataset that is associated with responses from a set of hosts with a set of respective known OS types. The method may also comprise training an OS detection model based on the training dataset. The method may further comprise providing the trained OS detection model to the OS detector. The training dataset may comprise one or more response-to-OS maps. Each response-to-OS map of the training dataset may comprise a response metadata and an OS mapped to that response metadata. Each response metadata may comprise a pattern of responses to a probe sequence. The probe sequence may comprise a sequence of one or more transport layer (e.g., TCP) probes. The trained OS detection model may enable the OS detector to detect an OS of a host based on a response set from the host to a corresponding probe set sent to the host. The response set may comprise one or more responses, and the probe set may comprise one or more transport layer probes.

An embodiment may be directed to a method to detect an operating system (OS) of a host. The method may be performed by an OS detector. The method may comprise sending a probe set to the host. The probe set may comprise one or more transport layer probes. The method may also comprise detecting the OS of the host based on a response set received from the host in response to the probe set. The response set may comprise one or more responses corresponding to the one or more transport layer probes of the probe set. The OS detector may comprise an OS detection model trained on a training dataset to detect operating systems. The training dataset may comprise one or more response-to-OS maps. Each response-to-OS map may comprise a response metadata and an OS mapped to that response metadata. Each response metadata may comprise a pattern of responses to a probe sequence comprising a sequence of one or more transport layer probes.

An embodiment may be directed to an operating system (OS) detection trainer. The OS detection trainer may comprise a memory and at least one processor coupled to the memory. The memory and the at least one processor may be configured to obtain a training dataset that is associated with responses from a set of hosts with a set of respective known OS types. The memory and the at least one processor may also be configured to train an OS detection model based on the training dataset. The memory and the at least one processor may further be configured to provide the trained OS detection model to the OS detector. The training dataset may comprise one or more response-to-OS maps. Each response-to-OS map of the training dataset may comprise a response metadata and an OS mapped to that response metadata. Each response metadata may comprise a pattern of responses to a probe sequence. The probe sequence may comprise a sequence of one or more transport layer (e.g., TCP) probes. The trained OS detection model may enable the OS detector to detect an OS of a host based on a response set from the host to a corresponding probe set sent to the host. The response set may comprise one or more responses, and the probe set may comprise one or more transport layer probes.

An embodiment may be directed to an operating system (OS) detector. The OS detector may comprise a memory and at least one processor coupled to the memory. The memory and the at least one processor may be configured to send a probe set to a host. The probe set may comprise one or more transport layer probes. The memory and the at least one processor may also be configured to detect the OS of the host based on a response set received from the host in response to the probe set. The response set may comprise one or more responses corresponding to the one or more transport layer probes of the probe set. The OS detector may comprise an OS detection model trained on a training dataset to detect operating systems. The training dataset may comprise one or more response-to-OS maps. Each response-to-OS map may comprise a response metadata and an OS mapped to that response metadata. Each response metadata may comprise a pattern of responses to a probe sequence comprising a sequence of one or more transport layer probes.

An embodiment may be directed to an operating system (OS) detection trainer. The OS detection trainer may comprise means for obtaining a training dataset that is associated with responses from a set of hosts with a set of respective known OS types. The OS detection trainer may also comprise means for training an OS detection model based on the training dataset. The OS detection trainer may further comprise means for providing the trained OS detection model to the OS detector. The training dataset may comprise one or more response-to-OS maps. Each response-to-OS map of the training dataset may comprise a response metadata and an OS mapped to that response metadata. Each response metadata may comprise a pattern of responses to a probe sequence. The probe sequence may comprise a sequence of one or more transport layer (e.g., TCP) probes. The trained OS detection model may enable the OS detector to detect an OS of a host based on a response set from the host to a corresponding probe set sent to the host. The response set may comprise one or more responses, and the probe set may comprise one or more transport layer probes.

An embodiment may be directed to an operating system (OS) detector. The OS detector may comprise means for sending a probe set to a host. The probe set may comprise one or more transport layer probes. The OS detector may also comprise means for detecting the OS of the host based on a response set received from the host in response to the probe set. The response set may comprise one or more responses corresponding to the one or more transport layer probes of the probe set. The OS detector may comprise an OS detection model trained on a training dataset to detect operating systems. The training dataset may comprise one or more response-to-OS maps. Each response-to-OS map may comprise a response metadata and an OS mapped to that response metadata. Each response metadata may comprise a pattern of responses to a probe sequence comprising a sequence of one or more transport layer probes.

An embodiment may be directed to a non-transitory computer-readable medium storing computer-executable instructions for an operating system (OS) detection trainer. The computer-executable instructions may comprise one or more instructions causing the OS detection trainer to obtain a training dataset that is associated with responses from a set of hosts with a set of respective known OS types. The computer-executable instructions may also comprise one or more instructions causing the OS detection trainer to train an OS detection model based on the training dataset. The computer-executable instructions may further comprise one or more instructions causing the OS detection trainer to provide the trained OS detection model to the OS detector. The training dataset may comprise one or more response-to-OS maps. Each response-to-OS map of the training dataset may comprise a response metadata and an OS mapped to that response metadata. Each response metadata may comprise a pattern of responses to a probe sequence. The probe sequence may comprise a sequence of one or more transport layer (e.g., TCP) probes. The trained OS detection model may enable the OS detector to detect an OS of a host based on a response set from the host to a corresponding probe set sent to the host. The response set may comprise one or more responses, and the probe set may comprise one or more transport layer probes.

An embodiment may be directed to a non-transitory computer-readable medium storing computer-executable instructions for an operating system (OS) detector. The computer-executable instructions may comprise one or more instructions causing the OS detector to send a probe set to a host. The probe set may comprise one or more transport layer probes. The computer-executable instructions may also comprise one or more instructions causing the OS detector to detect the OS of the host based on a response set received from the host in response to the probe set. The response set may comprise one or more responses corresponding to the one or more transport layer probes of the probe set. The OS detector may comprise an OS detection model trained on a training dataset to detect operating systems. The training dataset may comprise one or more response-to-OS maps. Each response-to-OS map may comprise a response metadata and an OS mapped to that response metadata. Each response metadata may comprise a pattern of responses to a probe sequence comprising a sequence of one or more transport layer probes.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
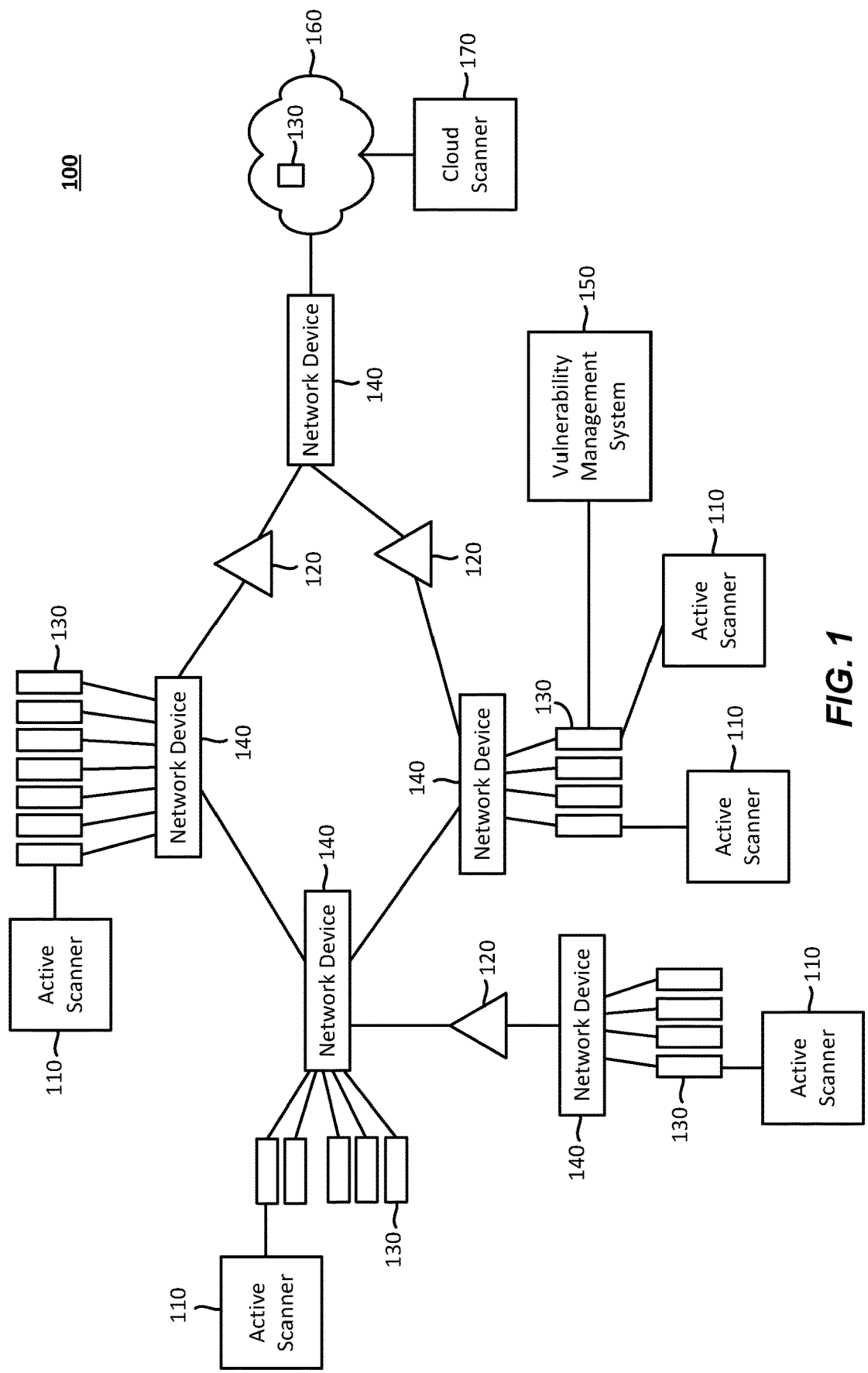
FIG. 1 illustrates an exemplary network having various assets that can be managed using a vulnerability management system, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, terms "host", "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), transport layer security (TLS) certificate, etc.). For example, the various aspects and embodiments described herein contemplate that an asset or host may be a physical electronic object such as, without limitation, a desktop computer, a laptop computer, a server, a storage device, a network device, a phone, a tablet, a wearable device, an Internet of Things (IoT) device, a set-top box or media player, industrial control system, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof.

Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

FIG. 1 illustrates an exemplary network 100 having various assets 130 that are interconnected via one or more network devices 140 and managed using a vulnerability management system 150. More particularly, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

The assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations.

Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived assess like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

The network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent.

Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
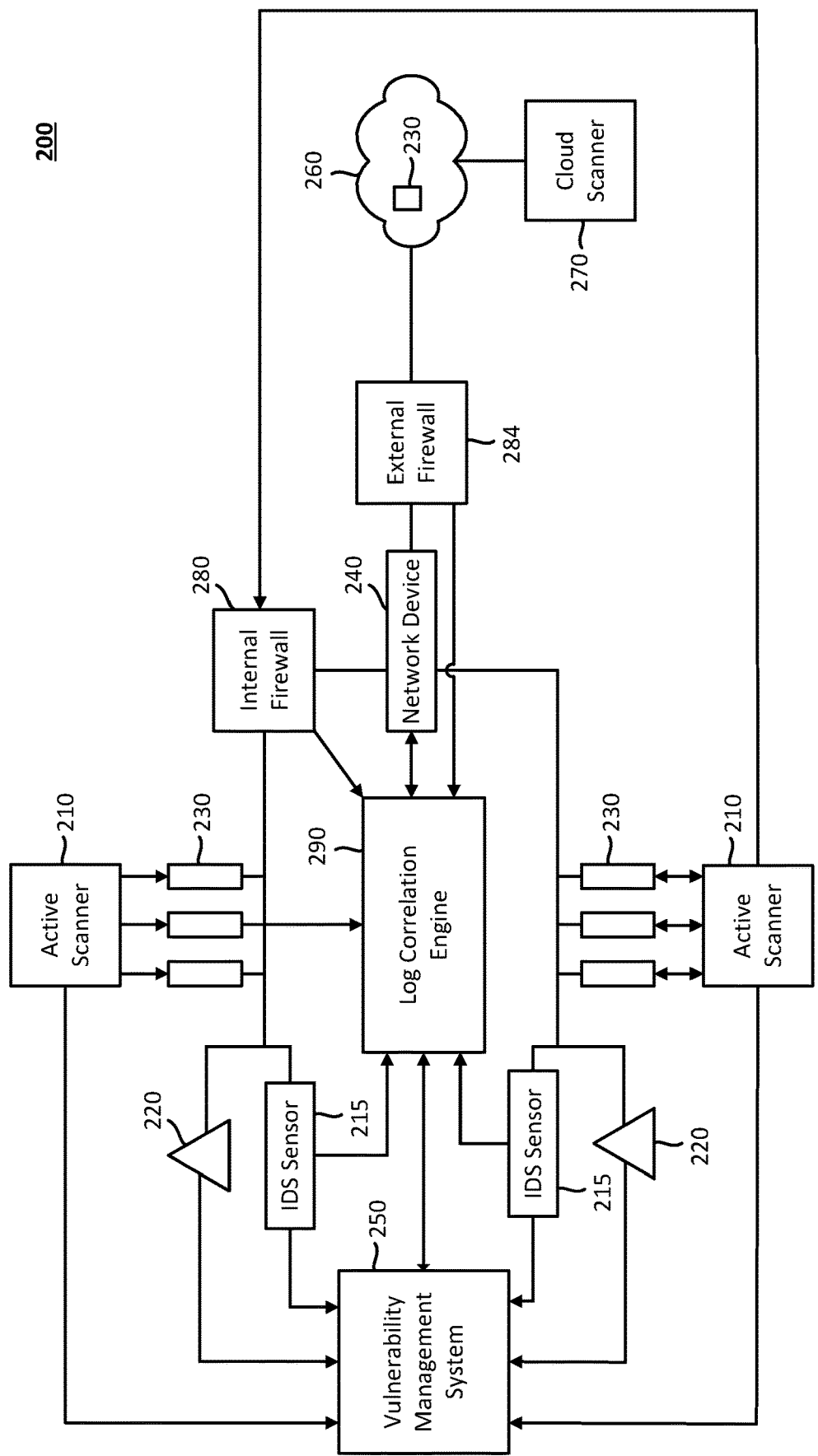
FIG. 2 illustrates another exemplary network having various assets that can be managed using a vulnerability management system, according to various aspects.

FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Security auditing applications typically display security issues (such as vulnerabilities, security misconfigurations, weaknesses, etc.) paired with a particular solution for that given issue. Certain security issues may share a given solution, or have solutions which are superseded or otherwise rendered unnecessary by other reported solutions. Embodiments of the disclosure relate to improving an efficiency by which security issues are reported, managed and/or rectified based on solution supersedence.

In accordance with a first embodiment, when working with security reporting datasets with sparse metadata available, the reported solutions for each security issue are combined, and various "rulesets" are applied against the combined solutions to de-duplicate them and remove solutions that have been superseded by other solutions. As used herein, a ruleset is a set of rules that govern when a solution is to be removed or merged with another and how that merge is to be accomplished. In an example, when solution texts not matching a given ruleset are discovered they are flagged for manual review. Examples of rules that may be included in one or more rulesets are as follows:

If there is more than one matching solution in the solution list, remove all but one of those solutions.

For solutions matching "Upgrade to <product> x.y.z" where x, y, and z are integers, select a single result with the highest x.y.z value (comparing against x first, then y, then z).

For solutions matching "Apply fix <fix> to <product>", create a new combined solution where <fix> for each solution is concatenated into a comma separated list for a given <product>.

In accordance with a second embodiment, when working with datasets with metadata available that have an identifier that allows grouping of solutions based on product (e.g., common product enumeration (CPE)) and timestamp information on when a fix has become available, the solutions for each group can be filtered with only display the latest "top level" solution for each group being displayed. In an example, the first and second embodiments can be implemented in conjunction with each other to produce a further refined solution set.

A "plug-in" may include logic and metadata for an individual security check in a security auditing application. A plugin may check for one or more mitigations/fixes and flag one or more individual security issues. CPE is a standardized protocol of describing and identifying classes of applications, operating systems, and hardware devices present among an enterprise's computing assets. CPE identifiers contain asset type information (OS/Hardware/Application), vendor, product, and can even contain version information. An example CPE string is "cpe:/o:microsoft:windows_vista:6.0:sp1", where "/o" stands for operating system, Microsoft is the vendor, windows vista is the product, major version is 6.0, and minor version is SP1. Further, a common vulnerabilities and exposures (CVE) identifier is an identifier from a national database maintained by NIST/Mitre which keeps a list of known vulnerabilities and exposures. An example identifier would be "CVE-2014-6271" which corresponds to the "ShellShock" vulnerability in the database.

In accordance with one implementation of the second embodiment, solutions (or solution 'texts') may first together based on the CPEs in the plugins they were reported in. The solutions are then sorted by the patch publication date from the plugins which they were sourced from. Solutions containing text that matches a pattern that indicates that the solution is likely a patch recommendation can all be removed from the group except the solution associated with the most recent patch. In this manner, patches with identifiers that cannot be easily sorted (e.g., patches with non-numerical identifiers) and/or for which no ruleset pertains in accordance with the first embodiment can be filtered out from the solution set. In some implementations, additional ruleset-based filtering from the first embodiment can also be applied, to filter out (or de-duplicate) additional duplicate solution information.

In accordance with a third embodiment, a security auditing application may evaluate further metadata in the solution report results that is added based upon asset-specific information (e.g., such as individual patches installed, which mitigations and patches are missing, what individual software installations are installed, patch supersedence information, the relationship between the mitigations/patches and security issues, etc.).

It is indicated above that determining a host's operating system (OS) remotely is difficult for various reasons such as changing PAT/NAT configurations, intermediate filtering devices and packet normalization, system hardening, etc. OS identification is especially difficult to do when credentialed access to the host is unavailable. Traditional approaches to identify operating systems rely on maintaining a known operating system lookup, via active or passive fingerprinting, which is a manual and error-prone task. For those approaches that rely on active fingerprinting, the retrieval of the necessary information may require crafting very specific network requests, which can result in host/network disturbance.

To address some or all disadvantages of conventional approaches toward host OS identification, it is proposed to predict or otherwise detect the OS of any host—credentialed or otherwise—based on transport layer probe response information without the need for intrusive testing or credentialed access. A transport control protocol (TCP) probe is an example of the transport layer probe.

Transport layer probes (e.g., TCP probes) can be sent to a host to elicit a response containing valuable information, in terms of transport layer (e.g., TCP layer) metadata patterns that can be mapped to the host Operating System. In addition, using machine learning, an OS detection model can be produced in which the model is capable of accurately predicting a host's OS based solely on information contained in these responses.

One advantage (of which there may be several) of the proposed OS detection model is the automatic creation and maintenance of a known operating system lookup by crafting simple, default transport layer probes (e.g., default TCP probes), and collecting and labelling the appropriate probe response metadata, which may also be transport layer responses. The collected and labeled responses may serve as a training dataset to train the OS detection model, which may be viewed as a form of a machine learning model. The responses may be gathered by a scanner.

In this way, a far wider range of known operating systems may be had. The proposed aspects also allow the predictions to account for the temporal nature of available operating systems and automatically eliminate bad entries (e.g., via filtering unlabeled entries) to avoid reduced prediction accuracy. As TCP metadata is generally set at the OS/kernel level, it is not affected by host hardening. Thus, the proposed aspects are resilient to those cases. The use of simple, default TCP probes also reduces potential noise in the network and avoids host disturbance.

While this is sufficient (i.e., OS of the host can be determined solely based on the transport layer probe response information), the host OS detection can be augmented with scan information, e.g., vulnerability scanning, asset discovery scanning, etc. The scan information may be arrived at through passive and/or active scanning.

In the proposed aspects, the following phases are identified: probing phase, modelling phase, implementation phase. These phases are described in further detail. In the description, TCP is specifically mentioned. This is merely for ease of description, and the concepts described can be generalized to the transport layer relatively straight forward. Also, since internet protocol (IP) is typically mentioned along with TCP, TCP/IP examples may also be described. Again, this is merely for convenience.

Probing Phase:

In the probing phase, a number of specific TCP requests are crafted and sent to a target host, and the resulting responses may be stored. In an aspect, a scanner (e.g., vulnerability scanner) may craft the TCP requests and store the responses. The specific TCP requests may be referred to as "probe sequence". Table 1 below is an example of a formulation of the TCP requests.

TABLE 1

| Probe/Request | IP header | TCP header | TCP options |
|---|---|---|---|
| #1 | TimeToLive = 255<br>Offset = 0 | Flags = SYN<br>Dest_port = dport<br>Source_port = random<br>WinSize = 5840<br>Seq = random<br>Ack = random | |
| #2 | TimeToLive = 255<br>Offset = 0 | Flags = SYN<br>Dest_port = dport<br>Source_port =<br>Source_port#1 + 1<br>WinSize = 5840<br>Seq = random<br>Ack = random | MSS = 0x05b4<br>Timestamps =<br>"DEAD" +<br>0x00000000<br>Window Scale =<br>0x01<br>SACK = enabled |
| #3 | TimeToLive = 255<br>Offset = 0 | Flags = SYN<br>Dest_port = dport<br>Source_port =<br>Source_port#2 + 1<br>WinSize = 5840<br>Seq = random<br>Ack = random | |

In general, a probe sequence may comprise a sequence of one or more transport layer probes. In this, the probe sequence is seen as comprising three TCP probes—i.e., first, second, and third TCP probes. Each TCP probe of the probe sequence may be sent to the host one at a time in order. That is the first TCP probe (i.e., probe #1) may be sent, then the second TCP probe (i.e., probe #2), and then the third TCP probe (i.e., probe #3) may be sent.

As seen, each TCP probe sent to the host may comprise a corresponding TCP header. That is, the first, second, and third TCP probes may respectively comprise first, second, and third TCP probe headers. For each TCP probe, some or all fields of the corresponding TCP probe header may be set to specified value or values. Note that for each TCP probe header, the following fields are indicated: flags, destination ports (Dest_port), source ports (Source_port), window size (WinSize), sequence number (Seq), and acknowledgement number (Ack). So as to distinguish the fields of each TCP header, each field will be prefaced with "first", "second", or "third". For example, "first probe source port number" will refer to the "Source_port" of the first TCP probe header, and "second probe window size" will refer to the "WinSize" of the second TCP probe header.

In an aspect, the probe sequence may be formulated such that some of the fields of the TCP probe headers may be set to be the same. For example, the first, second, and third probe sequence synchronization (SYN) flags respectively of the first, second, and third TCP probe headers may be set to 1. In another example, the first, second, and third probe destination ports respectively of the first, second, and third TCP probe headers may each be set to a port of the host. In a further example, the first, second, and third probe window sizes respectively of the first, second, and third TCP probe headers may be set to be the same window size value, e.g., 5840.

Also, the probe sequence may be formulated such that some of the fields of the TCP probe headers may be set to any value. That is, they may be the same or different. For example, the first, second, and third probe sequence numbers respectively of the first, second, and TCP probe headers may respectively be set to first, second, and third random sequence numbers, which may be the same or different from each other. As another example, the first, second, and third probe acknowledgment numbers respectively of the first, second, and TCP probe headers may respectively be set to first, second, and third random acknowledgment numbers, which may be same or different from each other.

Further, the probe sequence may be formulated such that some of the fields of the TCP probe headers are set to different values. In an aspect, it may be preferred that the first, second, and third source ports be different from each other. For example, the value of the first source port may be randomly generated. The second source port may be generated by incrementing the first source port by a small number (e.g., by 1). The third source port may be generated by incrementing the second source port also by the small number.

In an aspect, the first and third TCP probe headers may not include any probe TCP options (e.g., option-kind byte may be set to zero). However, the second TCP probe header may include one or more probe TCP options. For example, a probe maximum segment size (MSS) may be set to a segment size value (e.g., MSS=0x05B4). In another example, the times tamps may be set to a time step value (e.g., Timestamps="DEAD"+0x00000000). In a further example, a probe window scale may be set to a window scale value (e.g., Window scale=0x01). In a yet further example, a probe selective acknowledgment (SACK) may be enabled.

Note that in an aspect, the probe sequence may also comprise internet protocol (IP) probes. In Table 1, it is seen that the probe sequence may also comprise first, second, and third IP probes respectively comprising first, second, and third IP probe headers. Each of the IP probe headers may be sent to the host along with their corresponding TCP probes. That is, the first IP probe may be sent along with the first TCP probe, the second IP probe may be sent along with the second TCP probe, and the third IP probe may be sent along with the third TCP probe. Generally, the probe sequence may comprise one or more IP probes corresponding to the one or more TCP probes.

As seen in Table 1, the probe sequence may be formulated such that some of the fields of the IP probe headers are set to particular values. For example, first, second, and third time-to-live (TTL) fields respectively of the first, second, and third IP probe headers may each be set to a TTL value. In an aspect, a maximum TTL value (e.g., 255) may be assigned. As another example, the first, second, and third IP probe headers may each be set to an offset value. In an aspect, the offset value assigned may be 0 (indicating no offset).

As indicated above, the first, second, and the third TCP probes may be sent one at a time to the target host, and the resulting responses may be received. Features of the received responses may be stored, from which a response metadata may be generated. The response metadata may be defined as a pattern of responses to a probe sequence from a target host.

From the responses to the probe sequence, features may be stored to generate a response metadata. Table 2 illustrates examples of features that may be extracted from the responses to the probe sequence.

TABLE 2

| Feature | Response | Description | Type | Encoding |
|---|---|---|---|---|
| p1_b | # 1 | List of constants | string | categorical |
| p1_f | # 1 | TCP flags | string | categorical |
| p1_w | # 1 | TCP window size | string | ordinal |
| p1_o | # 1 | TCP options (no random values) | string | ordinal |
| p1_o_ws | # 1 | TCP Window Scale | int | ordinal |
| p1_o_sack | # 1 | TCP SACK | bool | categorical |
| p1_o_nop | # 1 | TCP number of NOP | int | ordinal |
| p1_o_len | # 1 | TCP options field length | int | ordinal |
| p1_m | # 1 | TCP MSS size | string | ordinal |
| p2_b | # 2 | List of constants | string | categorical |
| p2_f | # 2 | TCP flags | string | categorical |
| p2_w | # 2 | TCP window size | string | ordinal |
| p2_o | # 2 | TCP options (no random values) | string | ordinal |
| p2_o_ws | # 2 | TCP Window Scale | int | ordinal |
| p2_o_sack | # 2 | TCP SACK | bool | categorical |
| p2_o_nop | # 2 | TCP number of NOP | int | ordinal |
| p2_o_len | # 2 | TCP options field length | int | ordinal |
| p2_m | # 2 | TCP MSS size | string | ordinal |
| p3_b | # 3 | List of constants | string | categorical |
| p3_f | # 3 | TCP flags | string | categorical |
| p3_w | # 3 | TCP window size | string | ordinal |
| p3_o | # 3 | TCP options (no random values) | string | ordinal |
| p3_o_ws | # 3 | TCP Window Scale | int | ordinal |
| p3_o_sack | # 3 | TCP SACK | bool | categorical |
| p3_o_nop | # 3 | TCP number of NOP | int | ordinal |
| p3_o_len | # 3 | TCP options field length | int | ordinal |
| p3_m | # 3 | TCP MSS size | string | ordinal |
| authenticated | Scan data | Credentialed scan | boolean | categorical |
| islocalnet | Scan data | Host on same subnet as scanner | boolean | categorical |
| port | Scan data | TCP probes target port | integer | ordinal |
| scan_time | Scan data | duration of the scan (ms) | integer | ordinal |
| asset_age | Scan data | timespan since the asset was seen for the first time (days) | integer | ordinal |
| net_assets | Scan data | Detected assets in same subnet | integer | ordinal |
| open_ports | Scan data | Open port count on host | integer | ordinal |
| uptime | Scan data | TCP timestamp (TSval) | integer | Ordinal |

In the table, features starting with "p1" represent features extracted from a first TCP response received from the host in response to the first TCP probe, features starting with "p2" represent features extracted from a second TCP response received from the host in response to the second TCP probe, and features starting with "p3" represent features extracted from a third TCP response received from the host in response to the first TCP probe.

The features and their representations may be as follows:
"b" may represent a response list-of constants;
"f" may represent response TCP flags;
"w" may represent response TCP window size;
"o" may represent response TCP options;
"m" may represent the MSS size.

Then for example, "p1_b" may be a first response list-of-constants included in the first response. As another example, "p3_f" may be third response flags included in the third response. These features may be included in TCP headers of the first, second, and third responses.

In an aspect, the response metadata may be generated based on one or more of the "b", "f", "w", "o", and "m" fields of the TCP responses. For ease of discussion, it may be said that the response metadata as a whole may comprise first, second, and third response metadata. The first response metadata may be generated based on one or more of the first list-of-constants (p1_b), the first response flags (p1_f), the first response window size (p1_w), the first response TCP options (p1_o), and the first response MSS (p1_m) of the first TCP response. Similarly, the second response metadata may be generated based on one or more of the second list-of-constants (p2_b), the second response flags (p2_f), the second response window size (p2_w), the second response TCP options (p2_o), and the second response MSS (p2_m) of the second TCP response. The third response metadata may be generated based on one or more of the third list-of-constants (p3_b), the third response flags (p3_f), the third response window size (p3_w), the third response TCP options (p3_o), and the third response MSS (p3_m) of the third TCP response.

Note that the first, second, and third response TCP options (i.e., p1_o, p2_o, p3_o) may respectively include first, second, and third random values (e.g., timestamps). In an aspect, these may be ignored when generating the first, second, and third response metadata.

Each of the first, second, and third response TCP options (i.e., p1_o, p2_o, p3_o) may include other fields. The features within the response TCP options and their representations may be as follows:
"o_ws" may represent a response window scale;
"o_sack" may represent a response selective acknowledgment (SACK);
"o_nop" may represent a response number of no-operations (NOPs);
"o_len" may represent a response options field length.

Then for example, "p1_o_ws" may be a first response window scale included in the first response TCP options (e.g., included in p1_o). As another example, "p3_o_len" may be a third response options field length of the third response TCP options. Note that in an aspect, the MSS size may also be included in the response TCP options. That is, p1_m may be included in p1_o, p2_m may be included in p2_o, and p3_m may be included in p3_o.

Then, in an aspect, the response metadata may be generated also based on one or more of the "o_ws", "o_sack", "o_nop", and "o_len" fields in addition to one or more of the "b", "f", "w", "o", and "m" fields. That is, the first response metadata may be generated also based on one or more of the first response window scale (p1_o_ws), the first response selective acknowledgment (p1_o_sack), the first response number of NOPs (p1_o_nop), and the first response options field length (p1_o_len) of the first response TCP options. The second response metadata may be generated also based on one or more of the second response window scale (p2_o_ws), the second response selective acknowledgment (p2_o_sack), the second response number of NOPs (p2_o_nop), and the second response options field length (p2_o_len) of the second response TCP options. The third response metadata may be generated also based on one or more of the third response window scale (p3_o_ws), the third response selective acknowledgment (p3_o_sack), the third response number of NOPs (p2_o_nop), and the third response options field length (p3_o_len) of the third response TCP options.

Note that in Table 2, there are also fields "authenticated", "islocalnet", "port", "scan_time", "asset_age", "net_assets", "open_ports", and "uptime". These represent fields that may be extracted through scanning a network, e.g., by a vulnerability scanner, and may be obtained through active and/or passive scanning of the host. These are not necessarily transport layer responses. In an aspect, these fields may be obtained through credentialed scanning, i.e., by a vulnerability scanner that has authorized access to the host. In an aspect, the response metadata may be generated further based on any one or of these scan fields.

Modelling Phase:

In the modelling phase, the above indicated probe sequence may be sent to a set of hosts with a set of known OS types. In this way, response metadata from the responses received from the hosts may be mapped to their respective OS. In an aspect, the modelling phase may include the following activities:

Collect identified features within some duration of time (e.g., last 180 days of scan feature data);
Create/clean target variables (e.g., response metadata and corresponding operating systems):
  Remove records missing true operating systems;
  Remove records with target variable derived from sources (e.g., SinFP plugin) whose confidence levels are below a threshold minimum confidence level;
  Remove records with low information target variables;
  Remove records with target variables that are under-represented (e.g., below a threshold minimum number of cases);
  Standardize target variables where possible to reduce cardinality (e.g., Linux Kernel 3.16.0-77-generic on Ubuntu 14.04→Ubuntu 14.04 Linux Kernel 3.16).
Create training dataset:
  Remove non-feature columns:
  Format features to allow encoding for modelling (e.g., remove extraneous character to allow string feature to be converted to numeric feature);
  Split into features and labels datasets;
  Encode eligible features as either ordinal/categorical. Other features may be left as is.
Train OS detection model:
  Decision tree model, with feature pre-selection based on importance weights from a decision tree built on all available features.
Evaluate trained OS detection model:
  Evaluate the passed model via random permutation cross-validation, using custom performance metrics on both training and test datasets per fold.
Select best OS detection model and save:
  Best OS detection model may be a model with the largest 'bal_acc_split sum' which is a sum of 'balanced_accuracy' across the training and tests splits per fold;
  Save outputs to ensure reproducibility and facilitate plugins and application program interface (API) implementations:
    Training dataset;
    Best model (may be serialized);
    Model performance statistics;
    Model rules to allow plugin implementation:
      Explicit decision tree rules;
      Target variable lookup (e.g., model classes);
      Ordinal features mapping lookup.

Implementation Phase:

In the implementation phase, the OS detection model may be implemented to detect operating systems of hosts. The OS detection model maybe implemented in a device (e.g., processor, memory, OS detection model), or may be implemented as a plugin, e.g., into a scanner. The OS detection model, which may be a machine learning (ML) model, may be encoded as a plain text file that can be translated into a scripting language code (e.g., Nessus Attack Scripting Language (NASL) code) to produce and/or update a library included in plugins.

Figure 3:
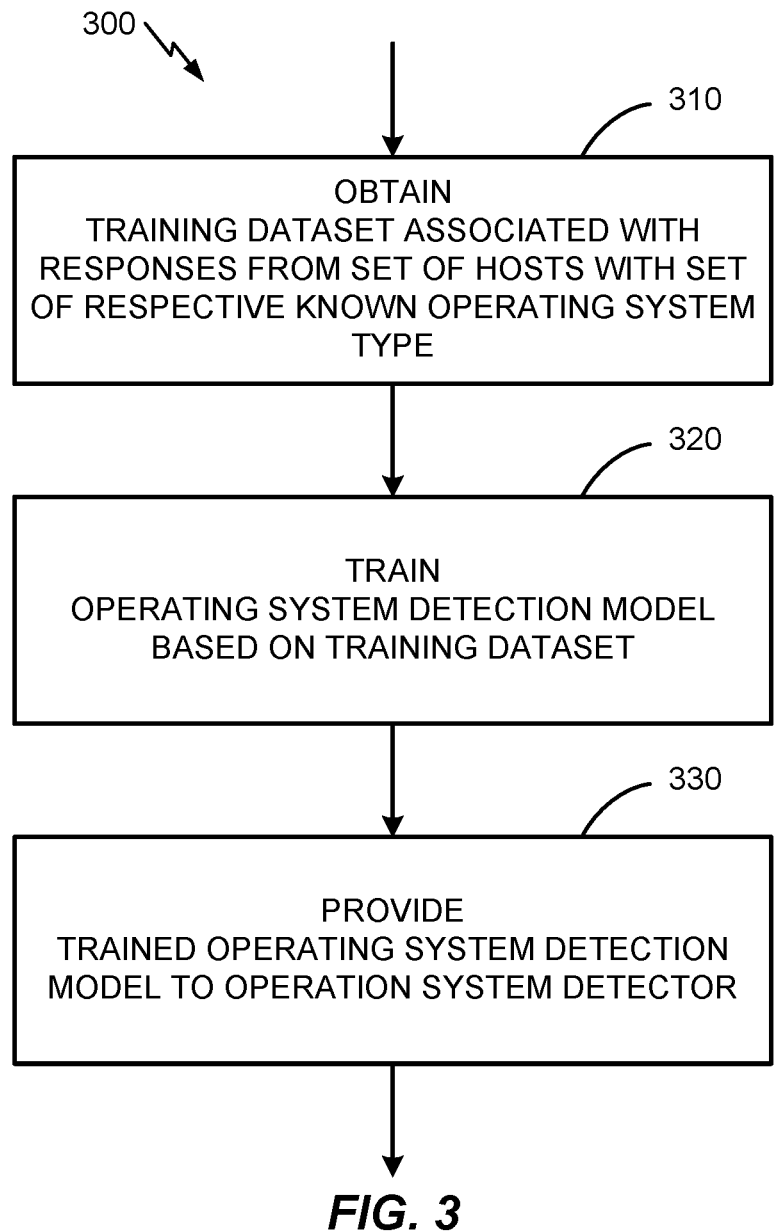
FIGS. 3 and 4 illustrate flow charts of an example method for training an operating system detector, according to various aspects.

FIG. 3 illustrates a flow chart of an example method 300 for training an operating system (OS) detector. The method 300 may be performed by an OS detection trainer. In an aspect, the vulnerability management system 150, 250 may also perform OS detection trainer functions. In block 310, the OS detection trainer may obtain a training dataset that is associated with responses from a set of hosts with a set of respective known OS types. In other words, for each host in the set of hosts, the OS of that host may be known.

The training dataset may comprise one or more response-to-OS maps. Each response-to-OS map of the training dataset may comprise a response metadata and an OS mapped to that response metadata. Each response metadata may comprise a pattern of responses to a probe sequence. The probe sequence may comprise a sequence of one or more transport layer (e.g., TCP) probes.

Figure 4:
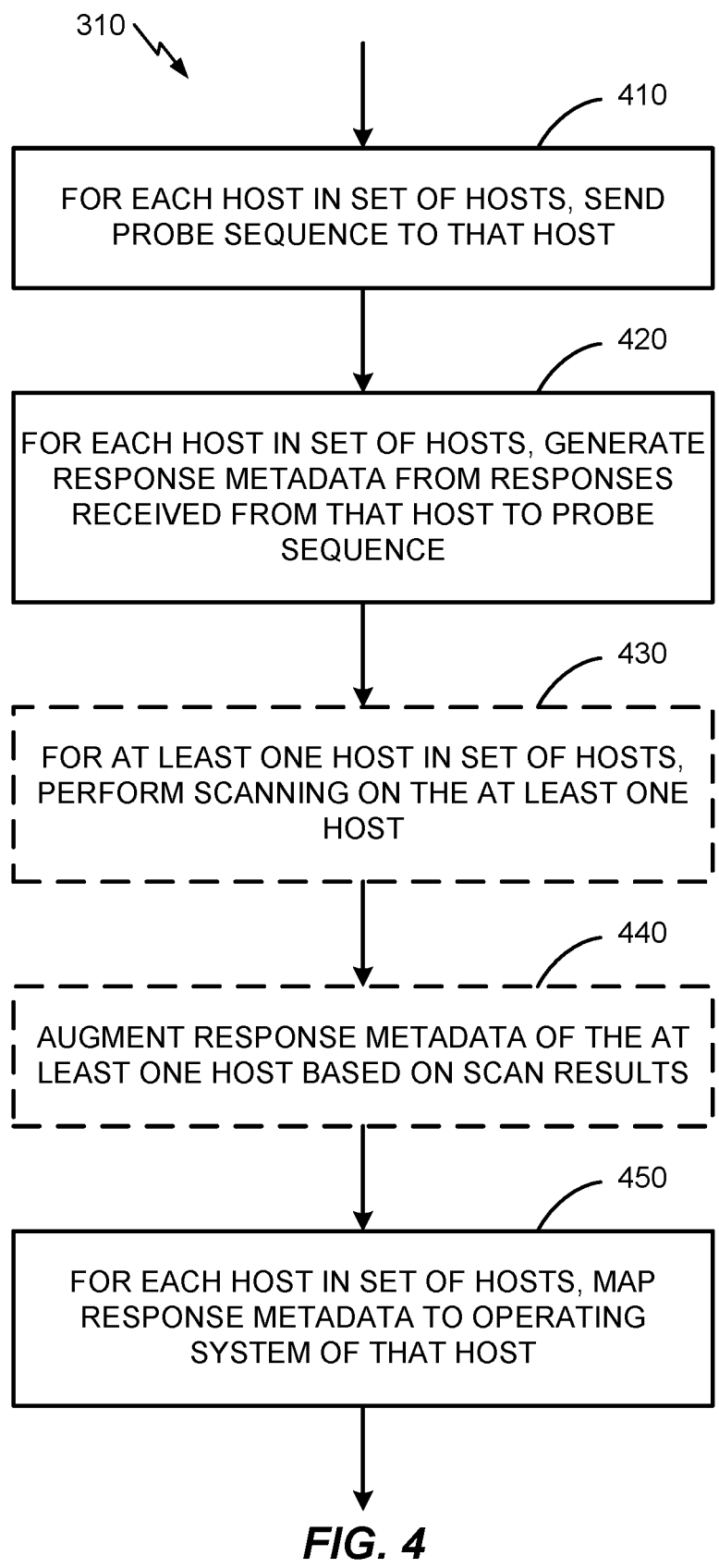

FIG. 4 illustrates a flow chart of an exemplary process that may be performed, e.g., by the OS detection trainer, to implement block 310. In block 410, for each host in the set of hosts, the OS detection trainer may send the probe sequence to that host. In an aspect, the same probe sequence may be sent to each of the hosts.

Recall also that the probe sequence may comprise one or more transport layer probes. For example, the probe sequence may comprise one or more TCP probes. In an aspect, each transport layer request may be formulated such that credential access is not required to elicit a response from the host. That is, the OS detection trainer need not be authorized.

Each TCP probe header may include fields that are set to specific values when sent to the host. The probe sequence may be formulated such that some fields of the first, second, and third TCP probe headers are set to specified values (e.g., see Table 1). The following are some examples:
  the first, second, and third probe sequence synchronization (SYN) flags respectively of the first, second, and third TCP probe headers may each be set to 1;
  the first, second, and third probe destination ports respectively of the first, second, and third TCP probe headers may each be set to a port of the host. The same port of the host may be assigned to the first, second, and third probe destination ports;
  the first, second, and third probe source ports respectively of the first, second, and TCP probe headers may respectively be set to first, second, and third source port numbers, which may be different from each other (e.g., set by incrementing port numbers);
  the first, second, and third probe window sizes respectively of the first, second, and third TCP probe headers may each be set to a same window size value;
  the first, second, and third probe sequence numbers respectively of the first, second, and TCP probe headers may respectively be set to first, second, and third random sequence numbers;
  the first, second, and third probe acknowledgment numbers respectively of the first, second, and TCP probe headers may respectively be set to first, second, and third random acknowledgment numbers.

In an aspect, the first and third TCP probe headers may not include any probe TCP options. In other words, the option-kind byte may be set to zero. However, the second TCP probe header may include probe TCP options. The following fields of the probe TCP options of the second TCP probe header may be set:

a probe MSS may be set to a segment size value (e.g., 0x05B4);

probe timestamps may be set to a timestamp value (e.g., "DEAD"+0x00000000);

a probe window scale may be set to a window scale value (e.g., 0x01);

a probe SACK may be enabled.

In block 420, for each host in the set of hosts, the OS detection trainer may generate the response metadata from responses received from that host to the probe sequence. As indicated above, an example probe sequence may comprise at least three TCP probes—first, second, and third TCP probes. Each TCP probe may comprise a respective TCP probe header. That is the first TCP probe may include a first TCP probe header, the second TCP probe may include a second TCP probe header, and the third TCP probe may include a third TCP probe header.

Recall that the response metadata associated with a host may comprise first, second, and third response metadata, respectively generated based on first, second, and third TCP responses received from the host respectively in response to the first, second, and third TCP probes.

In an aspect, the first response metadata may be generated based on one or more of the following fields of the first TCP response: first response list-of-constants (e.g, p1_b), first response flags (e.g., p1_f), first response window size (e.g., p1_w), first response TCP options (p1_o), and first MSS (p1_m). Random values in the first response TCP options may be ignored when generating the first response metadata.

In another aspect, the first response metadata may be generated based also on one or more of the following fields of the first response TCP options: first response window scale (p1_o_ws), first response SACK (p1_o_sack), first response number of NOPs (p1_o_nop), and first response options field length (p1_o_len).

In an aspect, the second response metadata may be generated based on one or more of the following fields of the second TCP response: second response list-of-constants (e.g, p2_b), second response flags (e.g., p2_f), second response window size (e.g., p2_w), second response TCP options (p2_o), and second MSS (p2_m). Random values in the second response TCP options may be ignored when generating the second response metadata.

In another aspect, the second response metadata may be generated based also on one or more of the following fields of the second response TCP options: second response window scale (p2_o_ws), second response SACK (p2_o_sack), second response number of NOPs (p2_o_nop), and second response options field length (p2_o_len).

In an aspect, the third response metadata may be generated based on one or more of the following fields of the third TCP response: third response list-of-constants (e.g, p3_b), third response flags (e.g., p3_f), third response window size (e.g., p3_w), third response TCP options (p3_o), and third MSS (p3_m). Random values in the third response TCP options may be ignored when generating the third response metadata.

In another aspect, the third response metadata may be generated based also on one or more of the following fields of the third response TCP options: third response window scale (p3_o_ws), third response SACK (p3_o_sack), third response number of NOPs (p3_o_nop), and third response options field length (p3_o_len).

In block 430, for at least one host in the set of hosts, an active and/or passive scan may be performed on that host (e.g., see Table 2). In an aspect, the OS detection trainer may also function as a scanner. In another aspect, a scanner (e.g., a vulnerability scanner) such as scanners 110, 210 may perform the scan and provide the result to the OS detection trainer. The scanning may be a credentialed scanning.

In block 440, the OS detection trainer may augment the response metadata of at least one host based on the scan results. This can increase accuracy of OS detection of the OS detection model. Blocks 430 and 440 are dashed to indicate that they are optional. Even if blocks 430 and 440 are performed, they need not be performed for all hosts in the set of hosts. In other words, not all response metadata need be augmented.

In block 450, for each host in the set of hosts, the OS detection trainer may map the response metadata generated based on responses to the probe sequence sent to that host to the operating system of that host. In this way, the training dataset may be obtained.

Referring back to FIG. 3, in block 320, the OS detection trainer may train the OS detection model based on the training dataset.

In block 330, the trained OS detection model may be provided to an OS detector. The trained OS detection model may enable the OS detector to detect an OS of a host based on a response set from the host to a corresponding probe set sent to the host. The response set may comprise one or more responses, and the probe set may comprise one or more transport layer probes.

Figure 5:
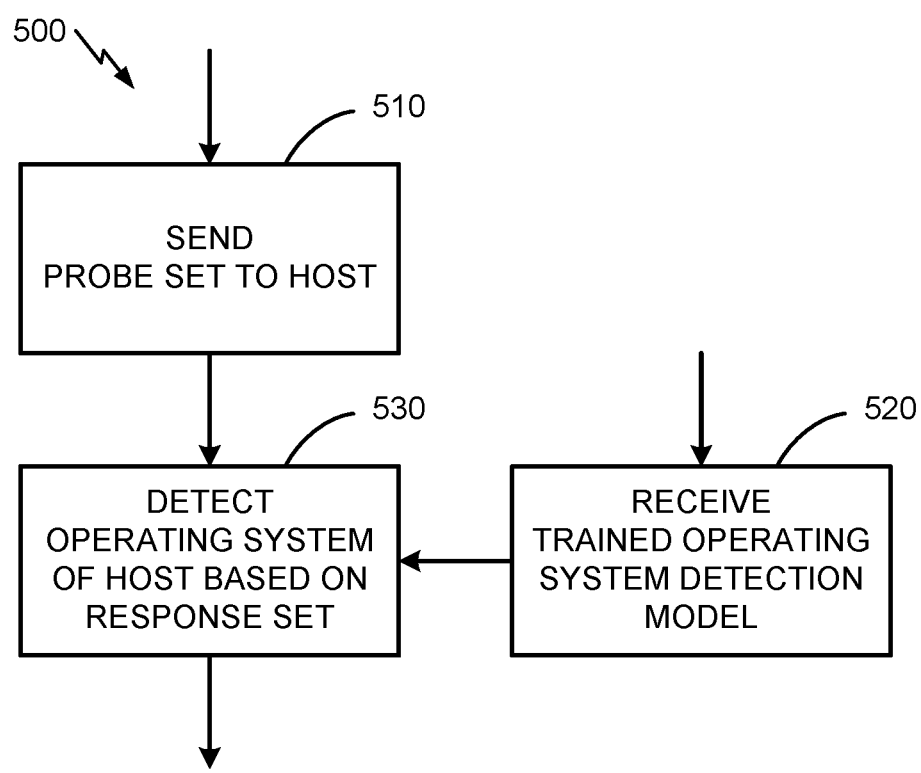
FIGS. 5 and 6 illustrate flow charts of an example method for detecting an operating system of a host, according to various aspects.

FIG. 5 illustrates a flow chart of an example method 500 for detecting an operating system of a host. The method 500 may be performed by an OS detector. In an aspect, scanners 110, 170, 210, 270 and/or the vulnerability management system 150, 250 may also perform OS detector functions. In block 510, the OS detector may send a probe set to the host. The probe set may comprise one or more transport layer probes. The probe set may be similar or the same as the probe sequence described above.

In block 520, the OS detector may receive a trained OS detection model, e.g., from an OS detection trainer. The OS detection model may be trained on a training dataset to detect operating systems of hosts. The training dataset has been described above, and thus is not repeated here.

In block 530, the OS detector may detect the operating system of the host based on a response set received from the host in response to the probe set. The response set may comprise one or more responses corresponding to the one or more transport layer probes of the probe set.

Figure 6:
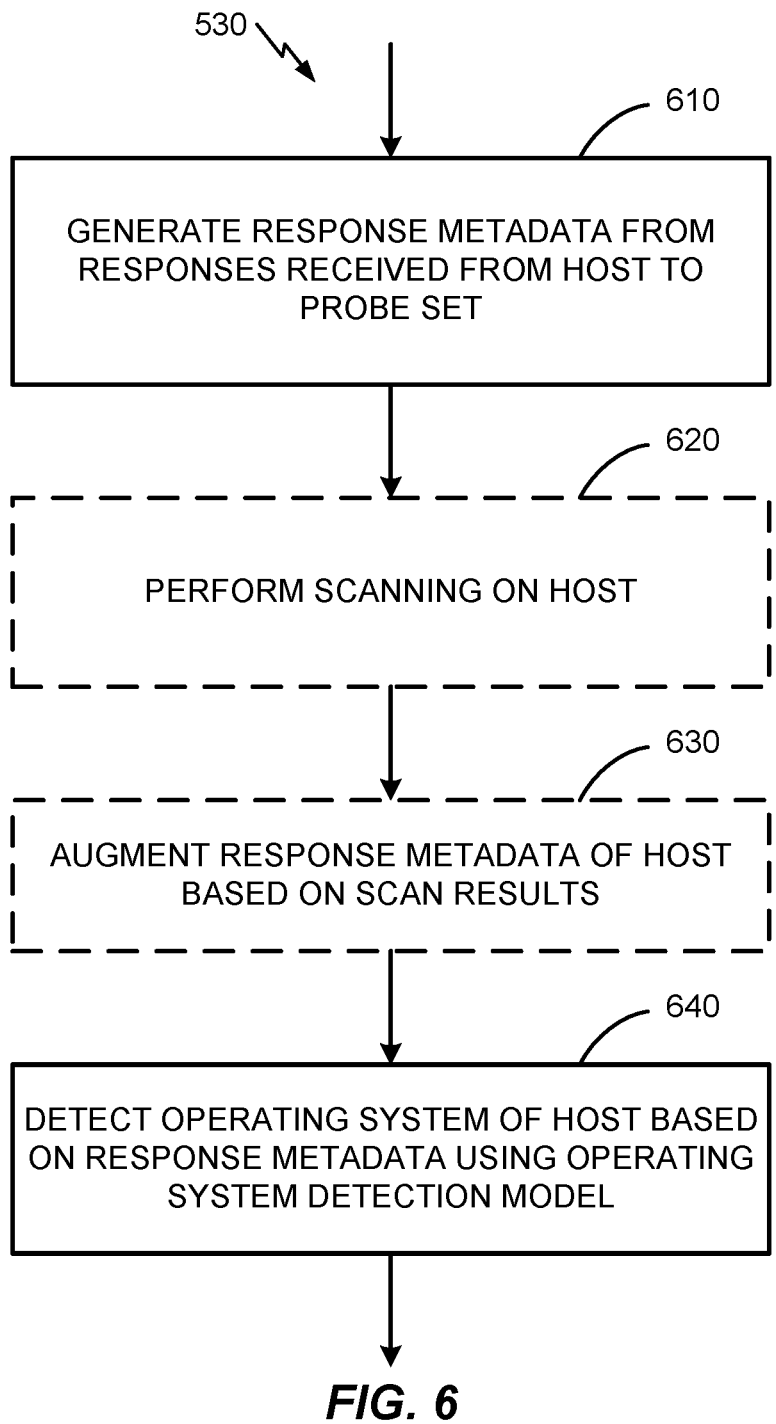

FIG. 6 illustrates a flow chart of an exemplary process that may be performed, e.g., by the OS detector, to implement block 530. In block 610, the OS detector may generate the response metadata from responses received from host to the probe set. The response metadata generated by the OS detector may be generated in a manner similar to the response metadata generated by the OS detection trainer in block 420.

In block 620, the OS detector may perform active and/or passive scanning on the host (in a manner similar to block 430). In block 630, the OS detector may augment the response metadata based on the scan results (in a manner similar to block 440). Blocks 620 and 630 may be optional.

In block 640, the operating system of the host may be detected based on the response metadata using the OS detection model.

For each host in the set of hosts, the OS detection trainer may map the response metadata generated based on responses to the probe sequence sent to that host to the operating system of that host. In this way, the training dataset may be obtained.

Figure 7:
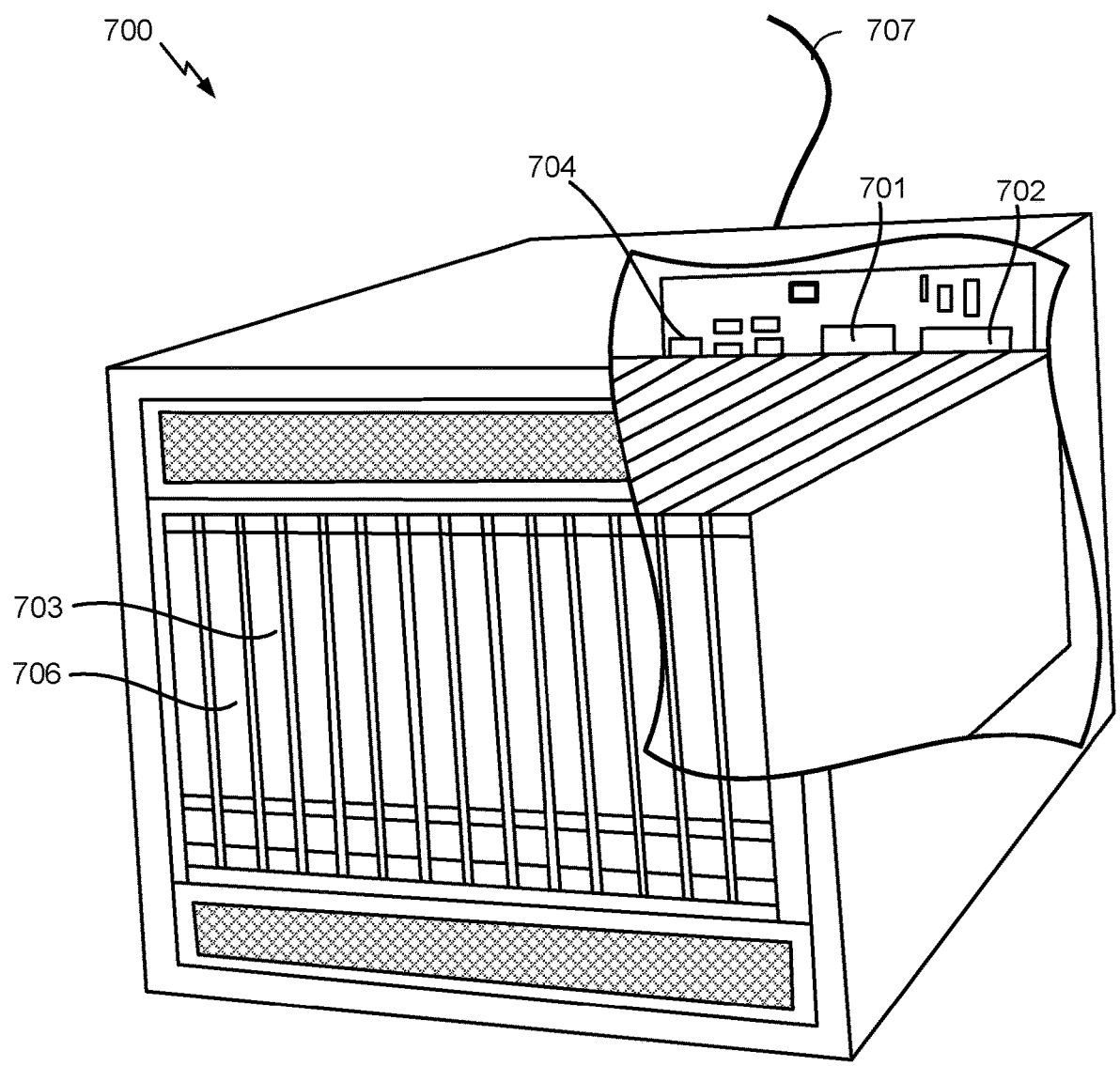
FIG. 7 illustrates an apparatus, according to various aspects of the disclosure, according to various aspects.

The various embodiments may be implemented on any of a variety of commercially available computing devices, such as an apparatus 700 illustrated in FIG. 7. In an example, the apparatus 700 may correspond to one example configuration of a computing device on applications that train OS detection model, e.g., as part of an OS detection trainer configured to perform the method illustrated in FIGS. 3 and 4. In another example, the apparatus 700 may correspond to one example configuration of a computing device on applications that detect operating systems of hosts e.g., as part of an OS detector configured to perform the method illustrated in FIGS. 5 and 6.

In FIG. 7, the apparatus 700 may include one or more processors 701 coupled to volatile memory 702 and a large capacity nonvolatile memory, such as a disk drive 703. The apparatus 700 may also include a floppy disc drive, flash/solid state media drive, compact disc (CD) or DVD disc drive 706 coupled to the one or more processors 701. The apparatus 700 may also include network access ports 704 coupled to the one or more processors 701 for establishing data connections with a network 707, such as a local area network coupled to other broadcast system computers and servers or to the Internet. The network access ports 704 may be more broadly described as communicators 704.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, flash/solid state media, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of training an operating system (OS) detector, the method comprising:
   obtaining a training dataset that is associated with responses from a set of training hosts with a set of respective known OS types;

training an OS detection model based on the training dataset; and providing the trained OS detection model to the OS detector, wherein the training dataset comprises one or more response-to-OS maps, each response-to-OS map comprising a response metadata of a training host of the set of training hosts and an OS of that training host mapped to that response metadata, each response metadata comprising a pattern of responses from the training host to a probe sequence sent to the training host, the probe sequence comprising a sequence of one or more transport layer probes, and wherein the trained OS detection model enables the OS detector to detect an OS of a target host based on a response set from the target host to a corresponding probe set sent to the target host, the response set comprising one or more responses, and the probe set comprising one or more transport layer probes.

2. The method of claim 1, wherein obtaining the training dataset comprises:

for each training host in the set of training hosts,
sending the probe sequence to that training host;
generating the response metadata from responses received from that training host to the probe sequence; and
mapping the response metadata to the OS of the training host.

3. The method of claim 2, wherein a same probe sequence is sent to each training host in the set of training hosts.

4. The method of claim 2, wherein each transport layer probe of the probe sequence is formulated such that credentialed access is not required to elicit a response from the training host.

5. The method of claim 2, wherein the probe sequence comprises a sequence of one or more transport control protocol (TCP) probes.

6. The method of claim 5, wherein the probe sequence comprises, in order, first, second, and third TCP probes respectively comprising first, second, and third TCP probe headers, the probe sequence being formulated such that first, second, and third probe sequence synchronization (SYN) flags respectively of the first, second, and third TCP probe headers are each set to 1, first, second, and third probe destination ports respectively of the first, second, and third TCP probe headers are each set to a port of the training host, first, second, and third probe source ports respectively of the first, second, and TCP probe headers are respectively set to first, second, and third source port numbers different from each other, first, second, and third probe window sizes respectively of the first, second, and third TCP probe headers are each set to a same window size value, first, second, and third probe sequence numbers respectively of the first, second, and TCP probe headers are respectively set to first, second, and third random sequence numbers, and first, second, and third probe acknowledgment numbers respectively of the first, second, and third TCP probe headers are respectively set to first, second, and third random acknowledgment numbers.

7. The method of claim 6, wherein the second TCP probe header comprises one or more probe TCP options such that a probe maximum segment size (MSS) is set to a segment size value, probe timestamps are set to a timestamp value, a probe window scale is set to a window scale value, and a probe selective acknowledgment (SACK) is enabled.

8. The method of claim 6, wherein the first and third TCP probe header do not comprise any probe TCP options.

9. The method of claim 6, wherein the response metadata comprises first, second, and third response metadata respectively generated based on first, second, and third TCP responses received from the training host respectively in response to the first, second, and third TCP probes, the first response metadata being generated based on one or more of a first response list-of-constants, first response flags, a first response window size, first response TCP options, and a first response maximum segment size (MSS) of the first TCP response, the second response metadata being generated based on one or more of a second response list-of-constants, second response flags, a second response window size, second response TCP options, and a second response MSS of the second TCP response, and the third response metadata being generated based on one or more of a third response list-of-constants, third response flags, a third response window size, third response TCP options, and a third response MSS of the third TCP response.

10. The method of claim 9, wherein the first TCP response comprises one or more first response TCP options, the first response metadata being generated also based on one or more of a first response window scale, a first response selective acknowledgment (SACK), a first response number of no-operations (NOPs), and a first response options field length of the first response TCP options, wherein the second TCP response comprises one or more second response TCP options, the second response metadata being generated also based on one or more of a second response window scale, a second SACK, a second response number of NOPs, and a second response options field length of the second response TCP options, and wherein the third TCP response comprises one or more third response TCP options, the third response metadata being generated also based on one or more of a third response window scale, a third SACK, a third response number of NOPs, and a third response options field length of the third response TCP options.

11. The method of claim 10, wherein first random values of the first response TCP options are ignored when generating the first response metadata, the first random values comprising one or more first timestamps, wherein second random values of the second response TCP options are ignored when generating the second response metadata, the second random values comprising one or more second timestamps, and wherein third random values of the third response TCP options are ignored when generating the third response metadata, the third random values comprising one or more third timestamps.

12. The method of claim 6, wherein the probe sequence further comprises, first, second, and third internet protocol (IP) probes respectively comprising first, second, and third IP probe headers, the first, second, and third IP probes respectively being sent along with the first, second, and third TCP probes, the first, second, and third IP probe headers being formulated such that first, second, and third time-to-live (TTL) fields respectively of the first, second, and third IP probe headers are each set to a maximum TTL value, and first, second, and third offset fields respectively of the first, second, and third IP probe headers are each set to zero.

13. The method of claim 6, wherein obtaining the training dataset further comprises:

for at least one training host of the one or more training hosts whose OS is known, performing an active or passive scanning on the at least one training host, wherein for the at least one training host, the response metadata is augmented based on results of the scanning.

14. The method of claim 13, wherein the scanning is a credentialed scanning.

15. A method to detect an operating system (OS) of a target host, the method comprising:

sending a probe set to the target host, the probe set comprising one or more transport layer probes; and detecting, by an OS detector, the OS of the target host based on a response set received from the target host in response to the probe set, the response set comprising one or more responses corresponding to the one or more transport layer probes of the probe set, wherein the OS detector comprises an OS detection model trained on a training dataset to detect operating systems, the training dataset comprising one or more response-to-OS maps, each response-to-OS map comprising a response metadata of a training host of the set of training hosts and an OS of that training host mapped to that response metadata, each response metadata comprising a pattern of responses from a training host to a probe sequence sent to the training host, the probe sequence comprising a sequence of one or more transport layer probes.

16. The method of claim 15, wherein detecting the OS of the target host comprises:

generating the response metadata from responses received from the target host in response to the probe set; and detecting the OS of the target host based on the response metadata using the OS detection model.

17. The method of claim 15, wherein each transport layer probe of the probe set is formulated such that credentialed access is not required to elicit a response from the target host.

18. The method of claim 15, wherein the probe set comprises, in order, first, second, and third transmission control protocol (TCP) probes respectively comprising first, second, and third TCP probe headers, the probe sequence being formulated such that first, second, and third probe sequence synchronization (SYN) flags respectively of the first, second, and third TCP probe headers are each set to 1, first, second, and third probe destination ports respectively of the first, second, and third TCP probe headers are each set to a port of the target host, first, second, and third probe source ports respectively of the first, second, and TCP probe headers are respectively set to first, second, and third source port numbers different from each other, first, second, and third probe window sizes respectively of the first, second, and third TCP probe headers are each set to a same window size value, first, second, and third probe sequence numbers respectively of the first, second, and TCP probe headers are respectively set to first, second, and third random sequence numbers, and first, second, and third probe acknowledgment numbers respectively of the first, second, and TCP probe headers are respectively set to first, second, and third random acknowledgment numbers.

19. The method of claim 18, wherein the first and third TCP probe header do not comprise any probe TCP options, and wherein the second TCP probe header comprises one or more probe TCP options such that a probe maximum segment size (MSS) is set to a segment size value, probe timestamps are set to a timestamp value, a probe window scale is set to a window scale value, and a probe selective acknowledgment (SACK) is enabled.

20. The method of claim 18, wherein the response metadata comprises first, second, and third response metadata respectively generated based on first, second, and third TCP responses received from the target host respectively in response to the first, second, and third TCP probes, the first response metadata being generated based on one or more of a first response list-of-constants, first response flags, a first response window size, first response TCP options, and a first response maximum segment size (MSS) of the first TCP response, the second response metadata being generated based on one or more of a second response list-of-constants, second response flags, a second response window size, second response TCP options, and a second response MSS of the second TCP response, and the third response metadata being generated based on one or more of a third response list-of-constants, third response flags, a third response window size, third response TCP options, and a third response MSS of the third TCP response.

21. The method of claim 20, wherein the first TCP response comprises one or more first response TCP options, the first response metadata being generated also based on one or more of a first response window scale, a first response selective acknowledgment (SACK), a first response number of no-operations (NOPs), and a first response options field length of the first response TCP options, wherein the second TCP response comprises one or more second response TCP options, the second response metadata being generated also based on one or more of a second response window scale, a second SACK, a second response number of NOPs, and a second response options field length of the second response TCP options, and wherein the third TCP response comprises one or more third response TCP options, the third response metadata being generated also based on one or more of a third response window scale, a third SACK, a third response number of NOPs, and a third response options field length of the third response TCP options.

22. The method of claim 18, wherein detecting the OS of the target host further comprises:

performing an active or passive scanning on the target host, wherein for the target host, the response metadata is augmented based on results of the scanning.

23. An operating system (OS) detection trainer, comprising:
- a memory; and
- at least one processor coupled to the memory,
- wherein the memory and the at least one processor are configured to:
  - obtain a training dataset that is associated with responses from a set of training hosts with a set of respective known OS types;
  - train an OS detection model based on the training dataset; and
  - provide the trained OS detection model to an OS detector,
- wherein the training dataset comprises one or more response-to-OS maps, each response-to-OS map comprising a response metadata of a training host of the set of training hosts and an OS of that training host mapped to that response metadata, each response metadata comprising a pattern of responses from the training host to a probe sequence sent to the training host, the probe sequence comprising a sequence of one or more transport layer probes, and
- wherein the trained OS detection model enables the OS detector to detect an OS of a target host based on a response set from the target host to a corresponding probe set sent to the target host, the response set comprising one or more responses, and the probe set comprising one or more transport layer probes.

24. An operating system (OS) detector, comprising:
- a memory; and
- at least one processor coupled to the memory,
- wherein the memory and the at least one processor are configured to:
  - send a probe set to a target host, the probe set comprising one or more transport layer probes; and
  - detect the OS of the target host based on a response set received from the target host in response to the probe set, the response set comprising one or more responses corresponding to the one or more transport layer probes of the probe set,
- wherein the OS detector comprises an OS detection model trained on a training dataset to detect operating systems, the training dataset comprising one or more response-to-OS maps, each response-to-OS map comprising a response metadata of a training host of the set of training hosts and an OS of that training host mapped to that response metadata, each response metadata comprising a pattern of responses from a training host to a probe sequence sent to the training host, the probe sequence comprising a sequence of one or more transport layer probes.

* * * * *